US012794492B2

(12) United States Patent
Li Puma et al.

(10) Patent No.: US 12,794,492 B2
(45) Date of Patent: Nov. 10, 2026

(54) TRANSMITTER WITH LOCAL OSCILLATOR FEEDTHROUGH (LOFT) AND IN-PHASE AND QUADRATURE MISMATCH (IQM) COMPENSATION

(71) Applicant: Cypress Semiconductor Corporation, San Jose, CA (US)

(72) Inventors: Giuseppe Li Puma, Bochum (DE); Stefano Marsili, Faak am See (AT); Alonso Morgado Garcia De Polavieja, Villach (AT)

(73) Assignee: Infineon Technologies Americas Corp., El Segundo, CA (US)

( * ) Notice: Subject to any disclaimer, the term of this patent is extended or adjusted under 35 U.S.C. 154(b) by 62 days.

(21) Appl. No.: 18/926,161

(22) Filed: Oct. 24, 2024

(65) Prior Publication Data

US 2026/0121666 A1 Apr. 30, 2026

(51) Int. Cl.
*H04B 1/00* (2006.01)
*H04B 1/12* (2006.01)

(52) U.S. Cl.
CPC ........... *H04B 1/0032* (2013.01); *H04B 1/001* (2013.01); *H04B 1/12* (2013.01)

(58) Field of Classification Search
CPC ......... H04B 1/0032; H04B 1/001; H04B 1/12
USPC ................. 375/219–222, 297, 343, 345, 350
See application file for complete search history.

(56) References Cited

U.S. PATENT DOCUMENTS 8,600,332 B2 * 12/2013 Dorsey .................. H04B 15/06 455/317
2010/0283649 A1 * 11/2010 Bos ......................... H03M 3/41 341/143
2013/0027110 A1 * 1/2013 Beale ....................... G06G 7/20 327/356
2013/0137381 A1 * 5/2013 Vassiliou ................. H04B 1/56 455/84
2013/0249720 A1 * 9/2013 Matsuura ................ H03M 1/06 341/118
2013/0344827 A1 * 12/2013 Epifano ................ H04L 27/364 455/114.3
2014/0362955 A1 * 12/2014 Muhammad ........ H04L 27/2278 375/343
2015/0023451 A1 * 1/2015 Muhammad .......... H03F 1/3241 375/297
2017/0179999 A1 * 6/2017 Vassiliou ................. H04B 1/56
2020/0059686 A1 * 2/2020 Yang ........................ G10L 15/26
2020/0177288 A1 * 6/2020 Oswal ................... H04L 27/364

(Continued)

*Primary Examiner* — Emmanuel Bayard

(57) ABSTRACT

A transmitter includes a modulator, a compensator, an up-converter, and a feedback path. The modulator generates a modulated signal at an intermediate frequency ($f_{IF}$) including an in-phase component and a quadrature component. The compensator generates a local oscillator feedthrough (LOFT) and in-phase and quadrature mismatch (IQM) compensated signal at $f_{IF}$ based on the modulated signal and feedback. The up-converter generates a transmit signal at a transmit frequency ($f_{TX}$) based on the LOFT and IQM compensated signal. The feedback path generates the feedback based on the transmit signal. The feedback path includes a quadrature bandpass analog-to-digital converter (ADC) to measure LOFT and IQM in the transmit signal.

20 Claims, 9 Drawing Sheets

(56) References Cited

U.S. PATENT DOCUMENTS

| | | | | |
|---|---|---|---|---|
| 2021/0265981 | A1* | 8/2021 | Camponeschi ....... | H03M 3/438 |
| 2022/0200838 | A1* | 6/2022 | Azadet ................... | H03D 3/009 |
| 2025/0341626 | A1* | 11/2025 | Santra ..................... | G01S 7/023 |
| 2025/0370086 | A1* | 12/2025 | Gomez Martinez .... | G01S 3/023 |

* cited by examiner

TRANSMITTER WITH LOCAL OSCILLATOR FEEDTHROUGH (LOFT) AND IN-PHASE AND QUADRATURE MISMATCH (IQM) COMPENSATION

BACKGROUND

In cartesian transmitters, such as in intermediate frequency (IF) up-conversion cartesian transmitters, one challenge is the mitigation of local oscillator feedthrough (LOFT) and in-phase and quadrature mismatch (IQM).

For these and other reasons, a need exists for the present invention.

SUMMARY

Some examples of the present disclosure relate to a transmitter. The transmitter includes a modulator, a compensator, an up-converter, and a feedback path. The modulator generates a modulated signal at an intermediate frequency ($f_{IF}$) including an in-phase component and a quadrature component. The compensator generates a local oscillator feedthrough (LOFT) and in-phase and quadrature mismatch (IQM) compensated signal at $f_{IF}$ based on the modulated signal and feedback. The up-converter generates a transmit signal at a transmit frequency ($f_{TX}$) based on the LOFT and IQM compensated signal. The feedback path generates the feedback based on the transmit signal. The feedback path includes a quadrature bandpass analog-to-digital converter (ADC) to measure LOFT and IQM in the transmit signal.

Other examples of the present disclosure relate to a transmitter. The transmitter includes a modulator, a compensator, an up-converter, and a feedback path. The modulator generates a modulated signal at an intermediate frequency ($f_{IF}$) including an in-phase component and a quadrature component. The compensator generates a local oscillator feedthrough (LOFT) and in-phase and quadrature mismatch (IQM) compensated signal at $f_{IF}$ based on the modulated signal and feedback. The up-converter generates a transmit signal at a transmit frequency ($f_{TX}$) based on the LOFT and IQM compensated signal. The feedback path generates the feedback based on the transmit signal. The feedback path includes a quadrature bandpass analog-to-digital converter (ADC) to measure LOFT and IQM in the transmit signal. The feedback path also includes a digital receiver chain between the quadrature bandpass ADC and the compensator to generate the feedback based on an output from the quadrature bandpass ADC.

Yet other examples of the present disclosure relate to a method for transmitting a signal. The method includes generating a modulated signal at an intermediate frequency ($f_{IF}$) including an in-phase component and a quadrature component. The method includes generating a local oscillator feedthrough (LOFT) and in-phase and quadrature mismatch (IQM) compensated signal based on the modulated signal and feedback. The method includes mixing the LOFT and IQM compensated signal with a local oscillator signal to generate a transmit signal at a transmit frequency ($f_{TX}$) based on the LOFT and IQM compensated signal. The method includes generating the feedback by measuring the LOFT and IQM of the transmit signal via a quadrature bandpass analog-to-digital converter (ADC).

DETAILED DESCRIPTION

Figure 1:
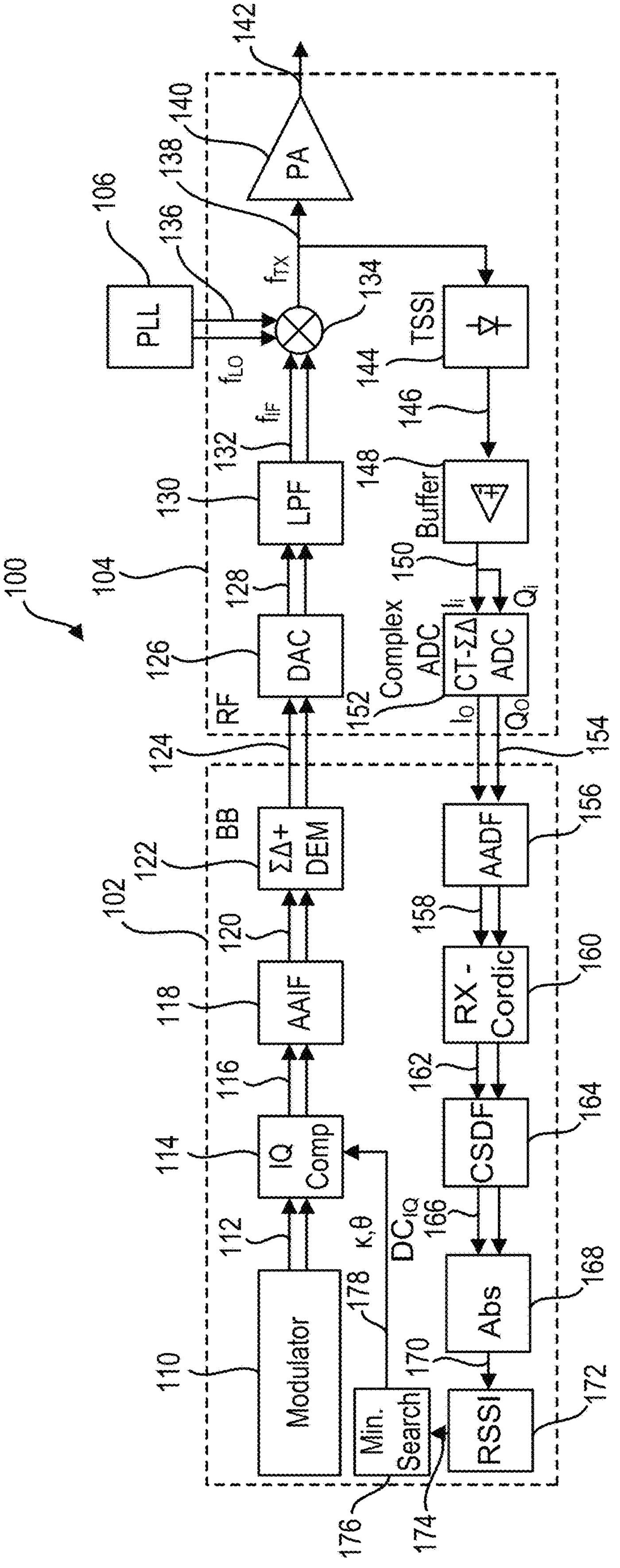
FIG. 1 is a block diagram illustrating an exemplary transmitter.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

An in-phase and quadrature (IQ) up-conversion transmitter for Bluetooth channel sounding (BT-CS) may include a modulator in the digital baseband (BB) that generates a complex baseband signal with an intermediate frequency ($f_{IF}$) equal to, for example, 4.2 MHz. In a practical implementation of the transmitter, the presence of local oscillator feedthrough (LOFT) and IQ mismatch (IQM) may generate undesired frequency components at a local oscillator frequency ($f_{LO}$) and at an intermodulation frequency ($f_{IM}$). The undesired frequency components may result in violation of the spectral mask (which defines the acceptable limits of signal power as a function of frequency and is used to control and manage interference between different frequency bands) when transmitting at higher output power levels (e.g., 0 dBm, +5 dBm). For the specific application of a Bluetooth channel sounding (BT-CS) transmitter, the image rejection for transmitting at a maximum output power level of +5 dBm should be at least 35 dB to meet the spectral mask requirement. In a typical design, this level of rejection is very difficult to achieve due to imprecisions of analog design. To meet the spectral mask requirements, an automatic LOFT and IQM calibration may be used as disclosed herein.

As disclosed herein, LOFT and IQM may be calibrated within a transmitter by utilizing a feedback path that includes an analog-to-digital converter (ADC) operated as a quadrature bandpass ADC with a programmable notch frequency. The notch frequency may be programmed to place the notch frequency at the intermediate frequency ($f_{IF}$) of the transmitter for a LOFT tone measurement and at 2 times $f_{IF}$ ($2\times f_{IF}$) for an IQM tone measurement. In this way, a dynamic range limitation due to ADC quantization noise is reduced which in turn results in a higher achievable signal to noise ratio (SNR) for LOFT and IQM calibration. Accordingly, as described below with reference to FIGS. 1-9D, the feedback path may include a peak detector to measure the transmitter carrier signal strength and a subsequent buffer, which may be realized through an operational amplifier with feedback. The buffer may provide a scaled signal to the input of a quadrature bandpass analog-to-digital converter (ADC) to measure LOFT and IQM in the transmit signal, which may be used to compensate for LOFT and IQM in the transmitted signal.

FIG. 1 is a block diagram illustrating an exemplary transmitter 100. In some examples, transmitter 100 is an intermediate frequency up-conversion in-phase and quadrature (IQ) transmitter. In some examples, transmitter 100 is a Bluetooth channel sounding (BT-CS) transmitter. In some examples, transmitter 100 is a BT-CS phase-based ranging (BT-CS-PBR) transmitter. Transmitter 100 includes a digital baseband (BB) portion 102, a radio frequency (RF) portion 104, and a phase-locked loop (PLL) 106. The digital baseband portion 102 may include a modulator 110, an IQ compensator 114, an anti aliasing interpolation filter (AAIF) 118, a sigma-delta and dynamic element matching (DEM) block 122, an anti aliasing decimation filter (AADF) 156, a receiver coordinate rotation digital computer (RX-Cordic) 160, a channel selection decimation filter (CSDF) 164, an absolute value detector 168, a received signal strength indicator (RSSI) detector 172, and minimum search logic 176. The RF portion 104 may include a digital-to-analog converter (DAC) 126, a low pass filter (LPF) 130, a mixer 134 (e.g., an up-converter), a power amplifier (PA) 140, a transmit signal strength indicator (TSSI) detector 144, a buffer 148, and a complex ADC 152 (e.g., a quadrature bandpass ADC).

The output of modulator 110 is electrically coupled to the input of IQ compensator 114 through a signal path 112, which may include in-phase and quadrature components as indicated by the two lines of signal path 112 and the other signal paths described below. The output of IQ compensator 114 is electrically coupled to the input of AAIF 118 through a signal path 116. The output of AAIF 118 is electrically coupled to the input of the sigma-delta and DEM block 122 through a signal path 120. The output of sigma-delta and DEM block 122 is electrically coupled to the input of DAC 126 through a signal path 124. The output of DAC 126 is electrically coupled to the input of LPF 130 through a signal path 128. The output of LPF 130 is electrically coupled to a first input of mixer 134 through a signal path 132. The output of PLL 106 is electrically coupled to a second input of mixer 134 through a signal path 136. The output of mixer 134 is electrically coupled to the input of PA 140 and an input of TSSI detector 144 through a signal path 138. The output of PA 140 is electrically coupled to a signal path 142.

The output of TSSI detector 144 is electrically coupled to the input of buffer 148 through a signal path 146. The output of buffer 148 is electrically coupled to the input of complex ADC 152 through a signal path 150, which includes I and Q components. The output of complex ADC 152 is electrically coupled to the input of AADF 156 through a signal path 154. The output of AADF 156 is electrically coupled to the input of RX-Cordic 160 through a signal path 158. The output of RX-Cordic 160 is electrically coupled to the input of CSDF 164 through a signal path 162. The output of CSDF 164 is electrically coupled to the input of absolute value detector 168 through a signal path 166. The output of absolute value detector 168 is electrically coupled to the input of RSSI detector 172 through a signal path 170. The output of RSSI detector 172 is electrically coupled to the input of minimum search logic 176 through a signal path 174. The output of minimum search logic 176 is electrically coupled to a feedback input of IQ compensator 114 through a signal path 178.

Modulator 110 generates a modulated signal at an intermediate frequency ($f_{IF}$) including an in-phase component and a quadrature component. In some examples, the intermediate frequency may equal zero (e.g., for Bluetooth enhanced data rate (BT-EDR)). IQ compensator 114 generates a LOFT and IQM compensated signal at $f_1$ based on the modulated signal and feedback. AAIF 118 may manage and process the LOFT and IQM compensated signal. Sigma-delta and DEM block 122 may further process the LOFT and IQM compensated signal for input to DAC 126. DAC 126 converts the LOFT and IQM compensated signal to an analog signal. LPF 130 low pass filters the analog LOFT and IQM compensated signal. Mixer 134 generates a transmit signal at a transmit frequency ($f_{TX}$) based on the LOFT and IQM compensated signal at $f_{IF}$ and a local oscillator signal from PLL 106 having a local oscillator frequency ($f_{LO}$). In some examples, the transmitter may be a digital transmitter and mixer 134 may be replaced by a radio frequency digital-to-analog converter (RF-DAC). PA 140 amplifies the transmit signal, which may be transmitted by an antenna circuit (not shown) electrically coupled to signal path 142. In some examples, PA 140 amplifies the transmit signal to a maximum output power level of +5 dBm.

A feedback path of transmitter 100 includes TSSI detector 144, buffer 148, complex ADC 152, AADF 156, RX-Cordic 160, CSDF 164, absolute value detector 168, RSSI detector 172, and minimum search logic 176. The feedback path generates the feedback input to IQ compensator 114 based on the transmit signal on signal path 138. The TSSI detector 144 (e.g., peak detector, rectifier, diode) measures a signal strength of the transmit signal as further described below with reference to FIGS. 4A and 4B. The buffer 148 generates a scaled signal to an input of the complex ADC 152 (e.g., a quadrature bandpass ADC) based on the measured signal strength of the transmit signal from the TSSI detector 144 (e.g., the buffer 148 scales the output voltage/current of the TSSI detector 144 output to the input of the complex ADC 152). The quadrature bandpass ADC 152 measures LOFT and IQM in the transmit signal from buffer 148.

Figure 2:
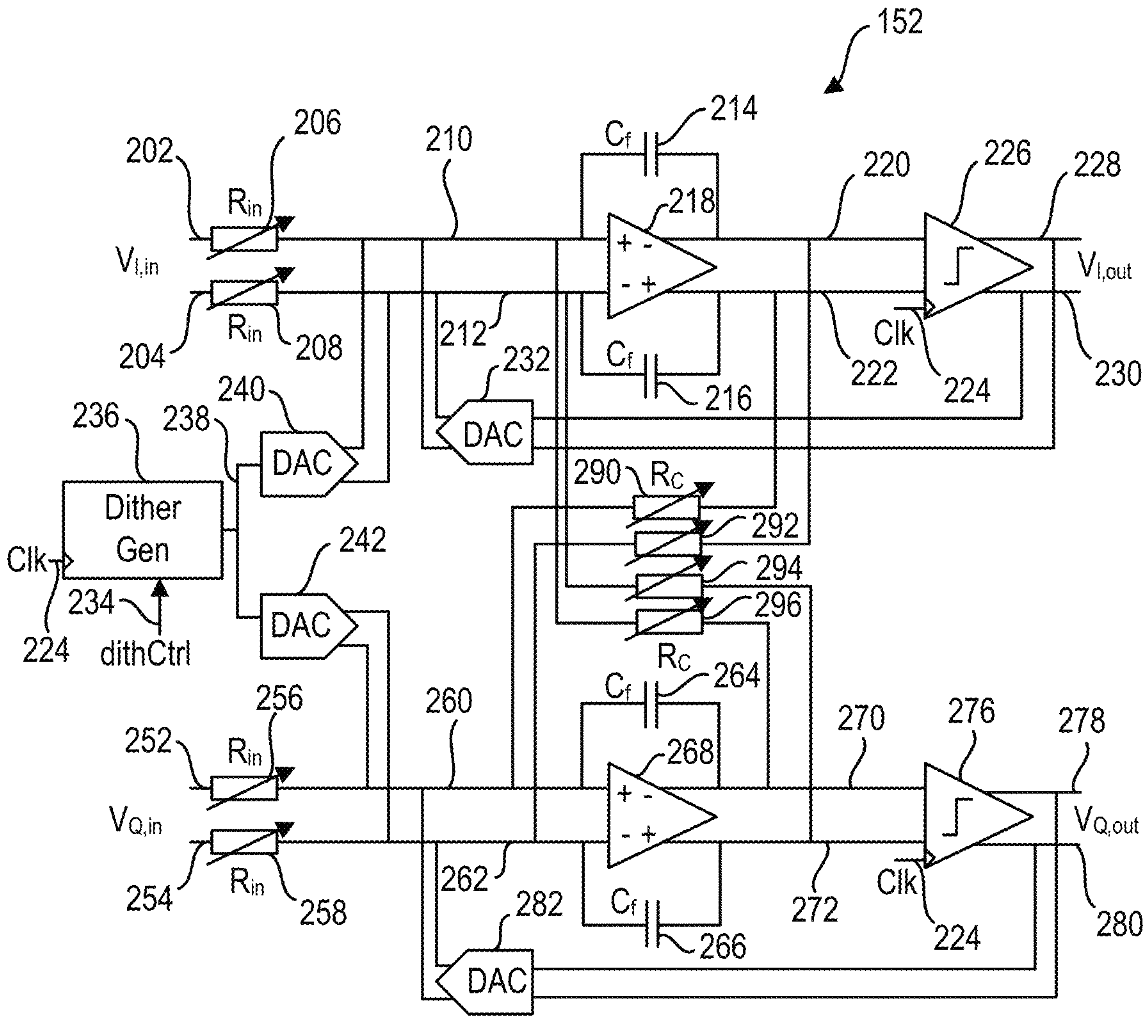
FIG. 2 is a schematic diagram illustrating an exemplary quadrature bandpass analog-to-digital converter (ADC).
Figure 3A:
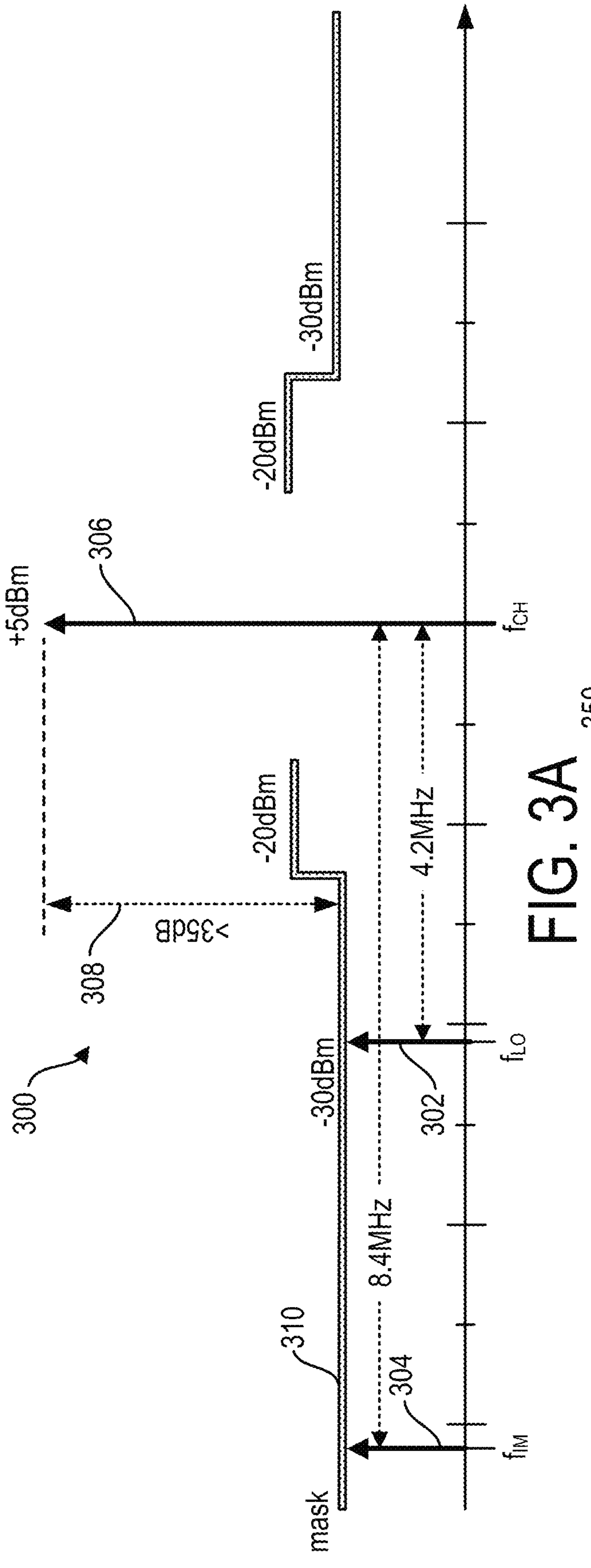
FIG. 3A is an exemplary output spectrum of a transmitter for Bluetooth channel sounding phase-based ranging (BT-CS-PBR) in the presence of LOFT and IQM.
Figure 3B:
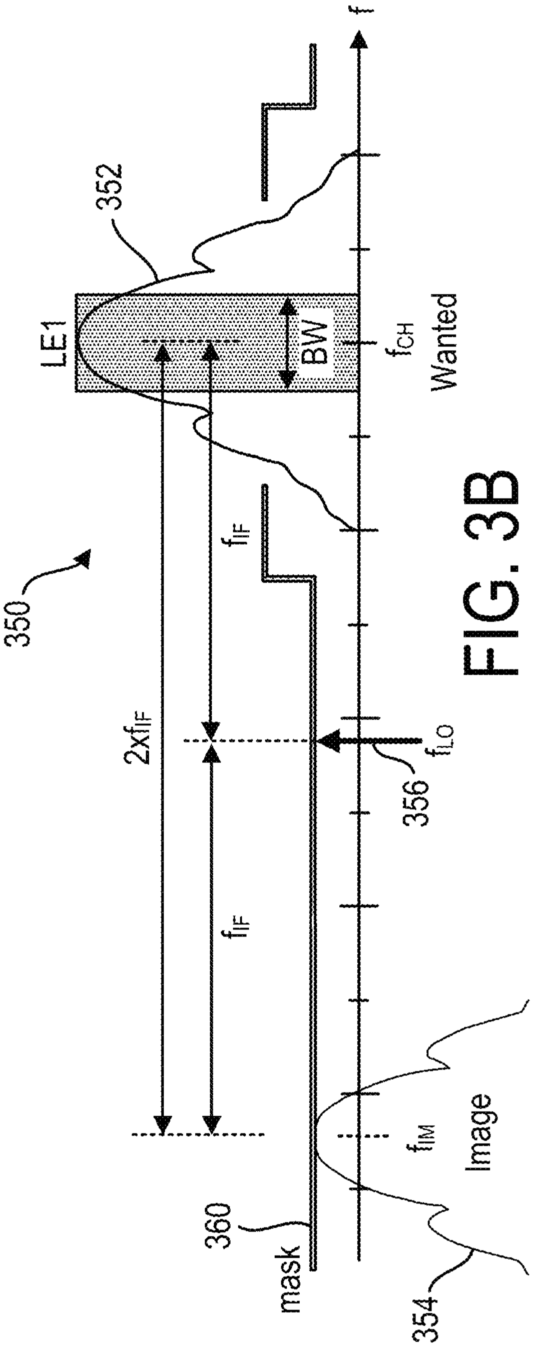
FIG. 3B is an exemplary output spectrum of a transmitter for Bluetooth channel sounding round-trip time (BT-CS-RTT) in the presence of LOFT and IQM.

As further described below with reference to FIG. 2, the quadrature bandpass ADC 152 includes a first portion to process an in-phase component of the transmit signal and a second portion to process a quadrature component of the transmit signal. The quadrature bandpass ADC 152 is set to a first notch frequency corresponding to a baseband frequency component produced by LOFT (as illustrated in FIGS. 3A and 3B) at a local oscillator frequency ($f_{LO}$) to measure LOFT in the transmit signal. In some examples, the first notch frequency equals or is in close proximity to the intermediate frequency ($f_{IF}$). The quadrature bandpass ADC 152 is set to a second notch frequency corresponding to a baseband frequency component produced by a tone or image (as illustrated in FIGS. 3A and 3B) at an intermodulation frequency ($f_{IM}$) to measure IQM in the transmit signal. In some examples, the second notch frequency equals or is in close proximity to two times the intermediate frequency ($2\times f_{IF}$). The quadrature bandpass ADC 152 includes programmable cross resistors (as illustrated in FIG. 2) to set the notch frequency of the quadrature bandpass ADC. In some examples, the quadrature bandpass ADC 152 includes a first order quadrature bandpass continuous-time (CT) sigma-delta ADC.

Figure 5A:
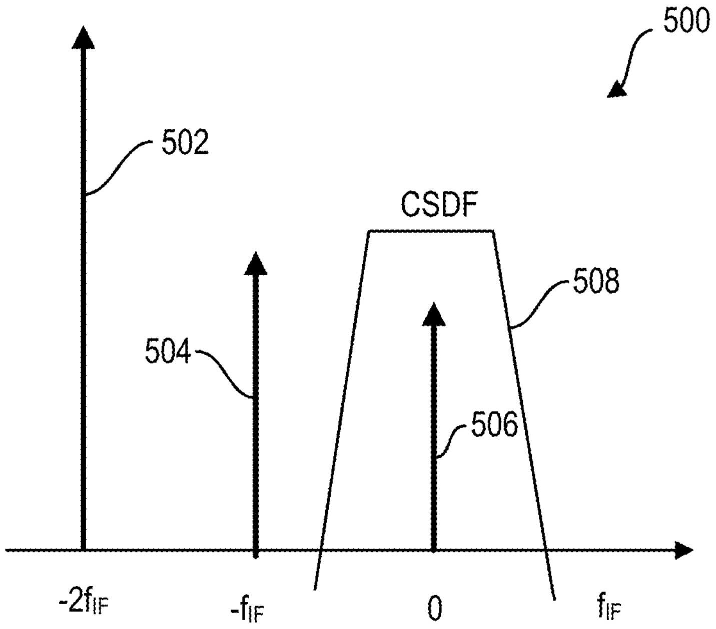
FIG. 5A illustrates an exemplary image tone selection for an IQM measurement via a channel selection filter of the transmitter of FIG. 1.
Figure 5B:
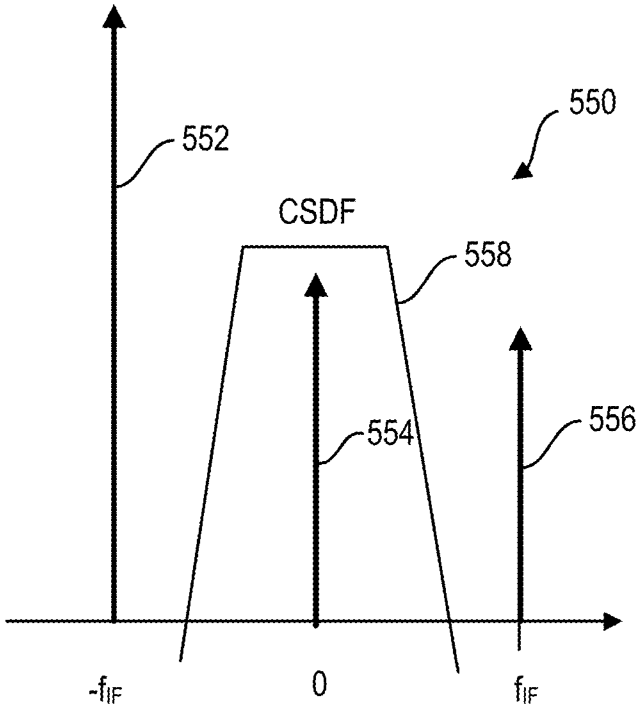
FIG. 5B illustrates an exemplary local oscillator (LO) tone selection for a LOFT measurement via a channel selection filter of the transmitter of FIG. 1.

The feedback path includes a digital receiver chain (e.g., AADF 156, RX-Cordic 160, CSDF 164, absolute value detector 168, RSSI detector 172, and minimum search logic 176) between the quadrature bandpass ADC 152 and the IQ compensator 114 to generate the feedback based on the output from the quadrature bandpass ADC. The digital receiver chain may include AADF 156 to filter the LOFT measurement and IQM measurement from the quadrature bandpass ADC 152. The digital receiver chain may include RX-Cordic 160 to shift the LOFT measurement and the IQM measurement (as illustrated in FIGS. 5A and 5B) to a reference point (e.g., 0). RX-Cordic 160 may shift the incoming signal by $-f_{IF}$ for a LOFT measurement (FIG. 5B) and by $-2\times f_{IF}$ for an IQM measurement (FIG. 5A). The control of RX-Cordic 160 may be coordinated with the control of the quadrature bandpass ADC 152 such that when the notch frequency of the quadrature bandpass ADC 152 is changed to measure LOFT, the RX-Cordic is configured to shift the measurement by $-f_{IF}$, and when the notch frequency of the quadrature bandpass ADC 152 is changed to measure IQM, the RX-Cordic is configured to shift the measurement by $-2\times f_{IF}$.

The digital receiver chain may include CSDF 164 to filter (e.g., low pass filter) the shifted LOFT measurement and the shifted IQM measurement (as illustrated in FIGS. 5A and 5B) to generate a filtered LOFT measurement and a filtered IQM measurement. The digital receiver chain may include absolute value detector 168 to compute the absolute value of the filtered LOFT measurement and the filtered IQM measurement. The digital receiver chain may include RSSI detector 172 to measure a signal strength of the filtered LOFT measurement and the filtered IQM measurement. The digital receiver chain may include minimum search logic 176 (e.g., golden section search) to generate the feedback based on the signal strength of the filtered LOFT measurement and the signal strength of the filtered IQM measurement. The feedback may include a modulation index (κ) parameter, a phase (θ) parameter, and a direct current component in the IQ signal ($DC_{IQ}$) parameter, which are input to the IQ compensator 114.

FIG. 2 is a schematic diagram illustrating an exemplary quadrature bandpass analog-to-digital converter (ADC) 152 of transmitter 100 of FIG. 1. Quadrature bandpass ADC 152 is a first order continuous-time (CT) quadrature bandpass ADC in this example. Quadrature bandpass ADC 152 converts analog inputs $V_{I,in}$(analog in-phase signal component) and $V_{Q,in}$ (analog quadrature signal component) to digital outputs $V_{I,out}$ (digital in-phase signal component) and $V_{Q,out}$ (digital quadrature signal component).

Quadrature bandpass ADC 152 includes programmable input resistors 206, 208, 256, and 258; programmable cross resistors 290, 292, 294, and 296; operational amplifiers 218 and 268; comparators 226 and 276; digital-to-analog converters (DACs) 232, 240, 242, and 282; and a dither generator 236. Quadrature bandpass ADC 152 may receive an analog in-phase input signal ($V_{I,in}$) on signal paths 202 and 204. The input of programmable resistor 206 is electrically coupled to signal path 202. The output of programmable resistor 206 is electrically coupled to an output of DAC 240, an output of DAC 232, one side of programmable cross resistor 296, one side of capacitor 214, and the non-inverting (+) input of operational amplifier 218 through a signal path 210. The input of programmable resistor 208 is electrically coupled to signal path 204. The output of programmable resistor 208 is electrically coupled to an output of DAC 240, an output of DAC 232, one side of programmable cross resistor 294, one side of capacitor 216, and the inverting (−) input of operational amplifier 218 through a signal path 212. The inverting (−) output of operational amplifier 218 is electrically coupled to the other side of capacitor 214, one side of programmable cross resistor 292, and an input of comparator 226 through a signal path 220. The non-inverting (+) output of operational amplifier 218 is electrically coupled to the other side of capacitor 216, one side of programmable cross resistor 290, and an input of comparator 226 through a signal path 222. Comparator 226 receives a clock signal (Clk) on signal path 224. The output of comparator 226 provides the digital in-phase output signal ($V_{I,out}$) on signal paths 228 and 230. The input of DAC 232 is electrically coupled to signal paths 228 and 230.

Quadrature bandpass ADC 152 may receive an analog quadrature input signal ($V_{Q,in}$) on signal paths 252 and 254. The input of programmable resistor 256 is electrically coupled to signal path 252. The output of programmable resistor 256 is electrically coupled to an output of DAC 242, an output of DAC 282, the other side of programmable cross resistor 290, one side of capacitor 264, and the non-inverting (+) input of operational amplifier 268 through a signal path 260. The input of programmable resistor 258 is electrically coupled to signal path 254. The output of programmable resistor 258 is electrically coupled to an output of DAC 242, an output of DAC 282, the other side of programmable cross resistor 292, one side of capacitor 266, and the inverting (−) input of operational amplifier 268 through a signal path 262. The inverting (−) output of operational amplifier 268 is electrically coupled to the other side of capacitor 264, the other side of programmable cross resistor 296, and an input of comparator 276 through a signal path 270. The non-inverting (+) output of operational amplifier 268 is electrically coupled to the other side of capacitor 266, the other side of programmable cross resistor 294, and an input of comparator 276 through a signal path 272. Comparator 276 receives a clock signal (Clk) on signal path 224. The output of comparator 276 provides the digital quadrature signal ($V_{Q,out}$) on signal paths 278 and 280. The input of DAC 282 is electrically coupled to signal paths 278 and 280.

Programable input resistors 206, 208, 256 and 258 may be programmed to set the full scale of the quadrature bandpass ADC 152. Programmable cross resistors 290, 292, 294, and 296 may be programmed to set the notch frequency (e.g., 4.2 MHz, 8.4 MHz, 9.375 MHz, etc.) of the quadrature bandpass ADC 152. In a power optimized receiver architecture, the ADC dynamic range is not exceedingly large. Therefore, to maximize the dynamic range, the quadrature bandpass ADC 152 may include a programmable notch frequency that coincides with the tone generated by LOFT at $f_{IF}$ and with the tone (or image) generated from IQM at $2\times f_{IF}$.

Dither generator 236 receives a clock signal (Clk) on signal path 224 and a dither control signal on signal path 234. The output of dither generator 236 is electrically coupled to the input of DAC 240 and the input of DAC 242 through a signal path 238. Dither generator 236 generates dithering sequences to prevent the generation of idle tones. Dither generator 236 generates dithering sequences based on the dither control signal. Dithering sequences may have a notch selectable from a frequency set (e.g., 0 MHz, 4.2 MHz, 8.4 MHz, 9.375 MHz, 11 MHz, 15 MHz, etc.). The dither control signal may select the clock frequency of the dither sequence (e.g., Clk, Clk/2, Clk/4, etc.). Due to the quadrature bandpass characteristics of ADC 152, the spectrum of the dithering may be realized with a configurable spectral notch that coincides with the notch frequency of ADC 152 determined by the programmable cross resistors 290, 292, 294, and 296 and the feedback capacitors 214, 216, 264, and 266. In this way, quadrature bandpass ADC 152 may achieve a maximum signal to noise ratio (SNR).

FIG. 3A is an exemplary output spectrum 300 of a transmitter for Bluetooth channel sounding phase-based ranging (BT-CS-PBR) in the presence of LOFT and IQM. In this example, the output spectrum 300 is for an intermediate frequency up-conversion transmitter for BT-CS-PBR continuous wave (CW) tone generation with an intermediate frequency ($f_{IF}$) equal to 4.2 MHz. In this example, LOFT and IQM results in undesired tones at a local oscillator frequency ($f_{LO}$) as indicated at 302 equal to a channel frequency ($f_{CH}$) minus $f_{IF}$ (e.g., 4.2 Mhz) and at the image as indicated at 304 at an intermodulation frequency ($f_{IM}$) equal to $f_{CH}$ minus 2 times $f_{IF}$ (e.g., 8.4 Mhz). For the example of a BT-CS transmitter, the image rejection for transmitting at a maximum output power level of +5 dBm as indicated at 306 should be at least 35 dB as indicated at 308 to meet the spectral mask requirement as indicated at 310. The spectral mask requirement may be −20 dBm closer to the channel frequency and drop to 30 dBm farther from the channel frequency as indicated at 310. To achieve an image suppression greater than 35 dB, the dynamic range of the feedback path of transmitter 100 should be at least 40 dB. This image rejection may be achieved as disclosed herein by compensating for LOFT and IQM using IQ compensator 114 of transmitter 100 of FIG. 1 based on feedback from a feedback path as previously described.

FIG. 3B is an exemplary output spectrum 350 of a transmitter for Bluetooth channel sounding round-trip time (BT-CS-RTT) in the presence of LOFT and IQM. In this example, the output spectrum 350 is of a low energy (LE) modulated signal for BT-CS wherein the intermediate frequency up-conversion transmitter with an intermediate frequency ($f_{IF}$) equal to 4.2 MHz sends a data packet (e.g., LE1) for round-trip time (RTT) measurements. The desired signal is indicated at 352 at the channel frequency ($f_{CH}$) and the undesired image signal due to IQM is indicated at 354 at an intermodulation frequency ($f_{IM}$), which equals $f_{CH}$ minus 2 times $f_{IF}$. An undesired tone due to LOFT as indicated at 356 at a local oscillator frequency ($f_{LO}$) equals $f_{CH}$ minus $f_{IF}$. The image rejection should meet the spectral mask requirement as indicated at 360. This image rejection may be achieved as disclosed herein by compensating for LOFT and IQM using IQ compensator 114 of transmitter 100 of FIG. 1 based on feedback from a feedback path as previously described.

Figure 4A:
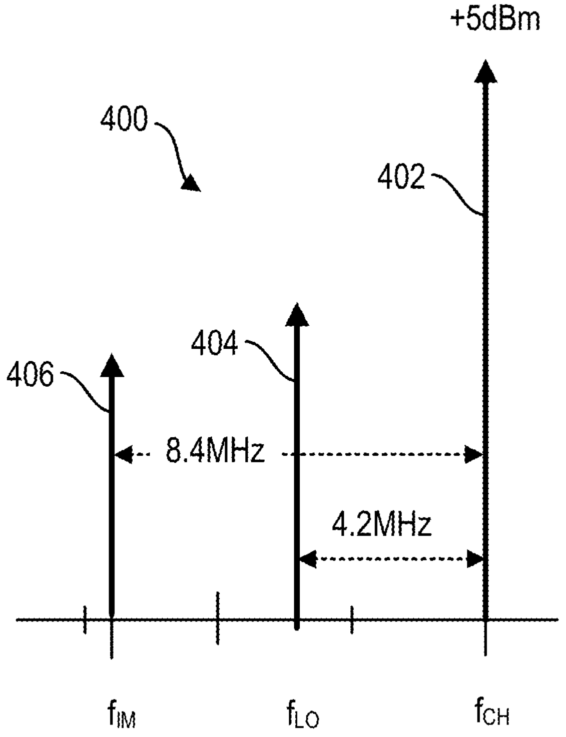
FIG. 4A is an exemplary output spectrum of the transmitter of FIG. 1 prior to a transmit signal strength indicator (TSSI) detector of a feedback path of the transmitter.

FIG. 4A is an exemplary output spectrum 400 of the transmitter 100 of FIG. 1 prior to the transmit signal strength indicator (TSSI) detector 144 of the feedback path of the transmitter. The transmit signal includes a desired signal as indicated at 402 at the channel frequency ($f_{CH}$), which may also be referred to as a transmit frequency ($f_{TX}$). The transmit signal also includes a tone as indicated at 404 due to LOFT at the local oscillator frequency ($f_{LO}$) and a tone (or image) as indicated at 406 due to IQM at an intermodulation frequency ($f_{IM}$). As illustrated in FIG. 4A, in this example, $f_{IM}$ is 8.4 MHz below $f_{CH}$, and $f_{LO}$ is 4.2 MHz below $f_{CH}$.

Figure 4B:
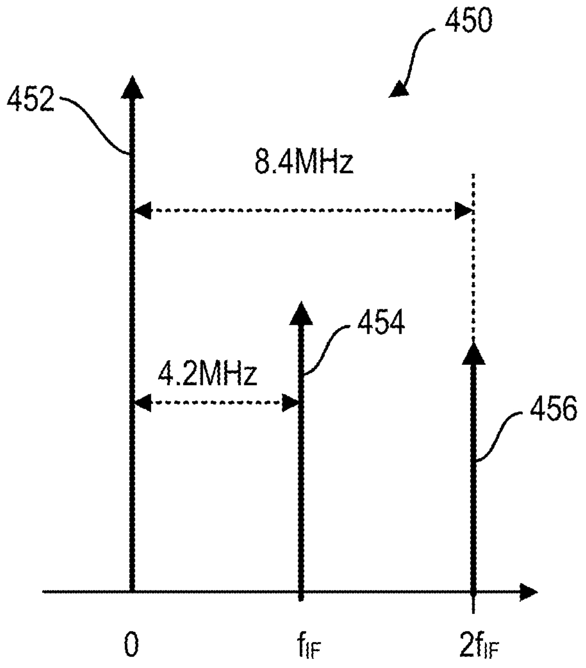
FIG. 4B is an exemplary output spectrum of the transmitter of FIG. 1 after the TSSI detector of the feedback path.

FIG. 4B is an exemplary output spectrum 450 of the transmitter 100 of FIG. 1 after the TSSI detector 144 of the feedback path of the transmitter. The desired signal as indicated at 452 is moved to 0, the tone as indicated at 454 due to LOFT is moved to $f_{IF}$ (e.g., 4.2 MHz), and the tone (or image) as indicated at 456 due to IQM is moved to $2f_{IF}$ (e.g., 8.4 MHz).

FIG. 5A illustrates an exemplary image tone selection 500 for an IQM measurement via the RX-Cordic 160 and the CSDF 164 of the transmitter 100 of FIG. 1. As illustrated in FIG. 5A, the desired signal as indicated at 502, the tone as indicated at 504 due to LOFT, and the tone (or image) as indicated at 506 due to IQM are shifted by $-2f_{IF}$ to shift the IQM measurement to a reference point (e.g., 0). The CSDF 164 filters (e.g., low pass filters) the IQM measurement as indicated at 508 such that only the IQM measurement 506, and not the desired signal 502 nor the LOFT measurement 504 are passed to the absolute value detector 168 and the RSSI detector 172.

FIG. 5B illustrates an exemplary local oscillator (LO) tone selection 550 for a LOFT measurement via the RX-Cordic 160 and the CSDF 164 of the transmitter 100 of FIG. 1. As illustrated in FIG. 5B, the desired signal as indicated at 552, the tone as indicated at 554 due to LOFT, and the tone (or image) as indicated at 556 due to IQM are shifted by $-f_{IF}$ to shift the LOFT measurement to a reference point (e.g., 0). The CSDF 164 filters (e.g., low pass filters) the LOFT measurement as indicated at 558 such that only the LOFT measurement 554, and not the desired signal 552 nor the IQM measurement 556 are passed to the absolute value detector 168 and the RSSI detector 172.

Figure 6A:
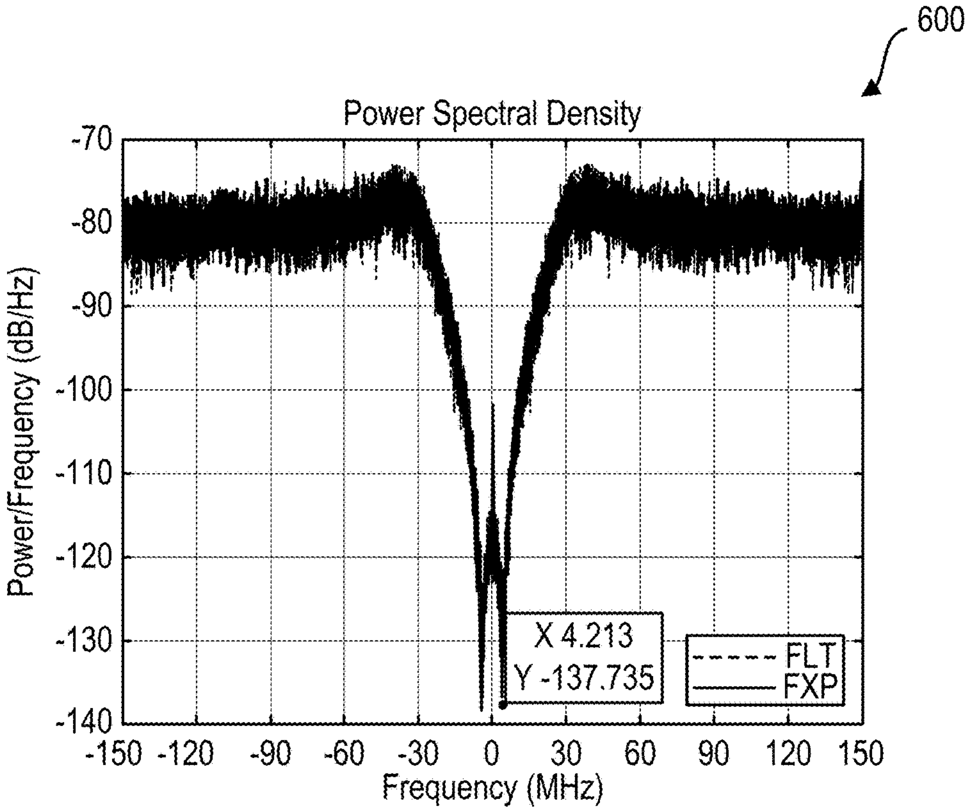
FIG. 6A is an exemplary power spectral density of a dithering sequence for the quadrature bandpass ADC of FIG. 2 with a notch frequency at 4.2 megahertz.
Figure 6B:
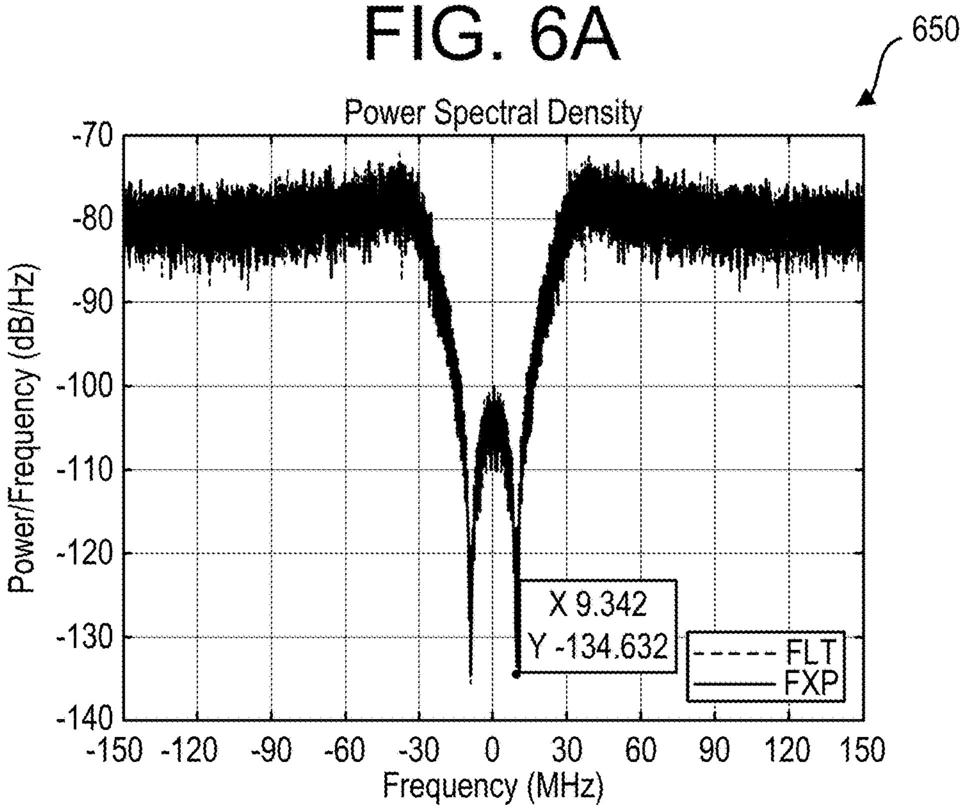
FIG. 6B is an exemplary power spectral density of a dithering sequence for the quadrature bandpass ADC of FIG. 2 with a notch frequency at 9.375 megahertz.

FIG. 6A is an exemplary power spectral density 600 of a dithering sequence for dither generator 236 of the quadrature bandpass ADC 152 of FIG. 2 with a notch frequency at 4.2 MHz. The clock frequency is 100 MHz in this example. As illustrated in FIG. 6A, the filtered noise (FLT) and the fixed-point noise (FXP) are reduced around the notch frequency. FIG. 6B is an exemplary power spectral density 650 of a dithering sequence for dither generator 236 of the quadrature bandpass ADC 152 of FIG. 2 with a notch frequency at 9.375 MHz. The clock frequency is 100 MHz in this example. As illustrated in FIG. 6B, the FLT and FXP are reduced around the notch frequency. As described above, the notch frequency of the dither generator 236 can be set equal to the notch frequency of the ADC as determined by the programmable cross resistors 290, 292, 294, and 296.

Figure 7A:
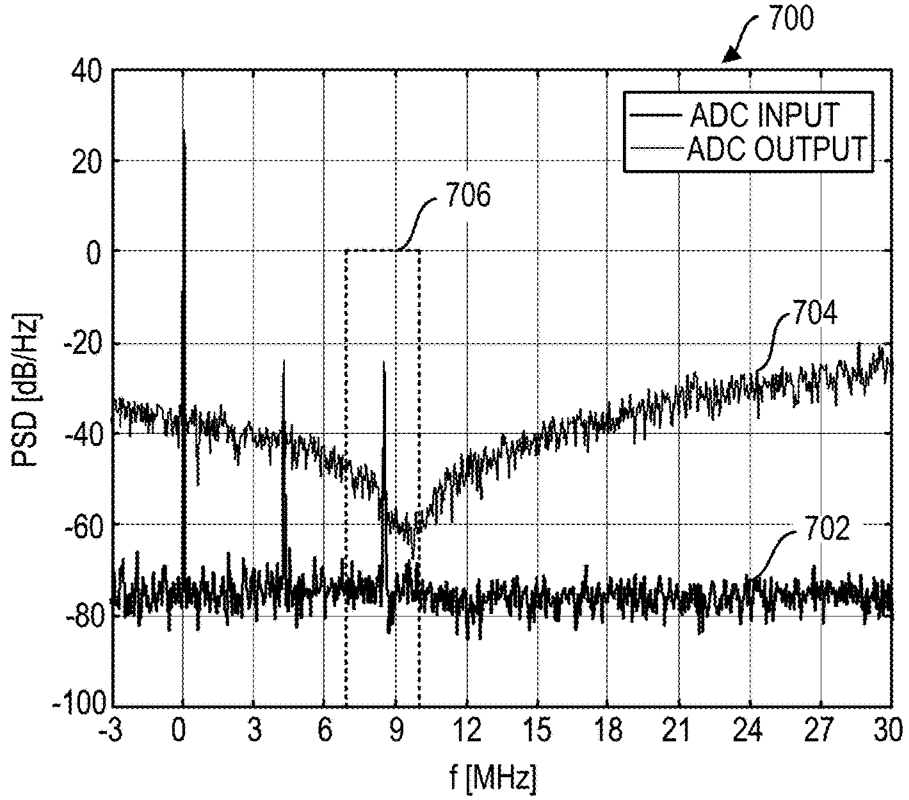
FIG. 7A is an exemplary output spectrum of the quadrature bandpass ADC of FIG. 2 for an IQM measurement.

FIG. 7A is an exemplary output spectrum 700 of the quadrature bandpass ADC 152 of FIG. 1 and FIG. 2 for the IQM measurement. The ADC input is indicated at 702, while the ADC output is indicated at 704. In this example, the notch frequency is set to 9.375 MHz. Accordingly, in the relevant frequency range as indicated at 706 for measuring IQM, noise is suppressed. In some examples, a dynamic range improvement of about 12 dB may be obtained by using a quadrature bandpass ADC compared to using an ADC that operates as a lowpass ADC. The dynamic range improvement of about 12 dB may be sufficient to reach the spectral mask requirement (e.g., as illustrated in FIGS. 3A and 3B). While the frequency of interest in this example is 8.4 MHz, the notch frequency does not need to be precisely centered at 8.4 MHz but may be slightly offset at 9.375 MHz, which corresponds to the intermediate frequency for a LE1 packet reception. Accordingly, the notch frequency does not necessarily need to be exactly at the desired image frequency of 8.4 MHz, but rather in close proximity.

Figure 7B:
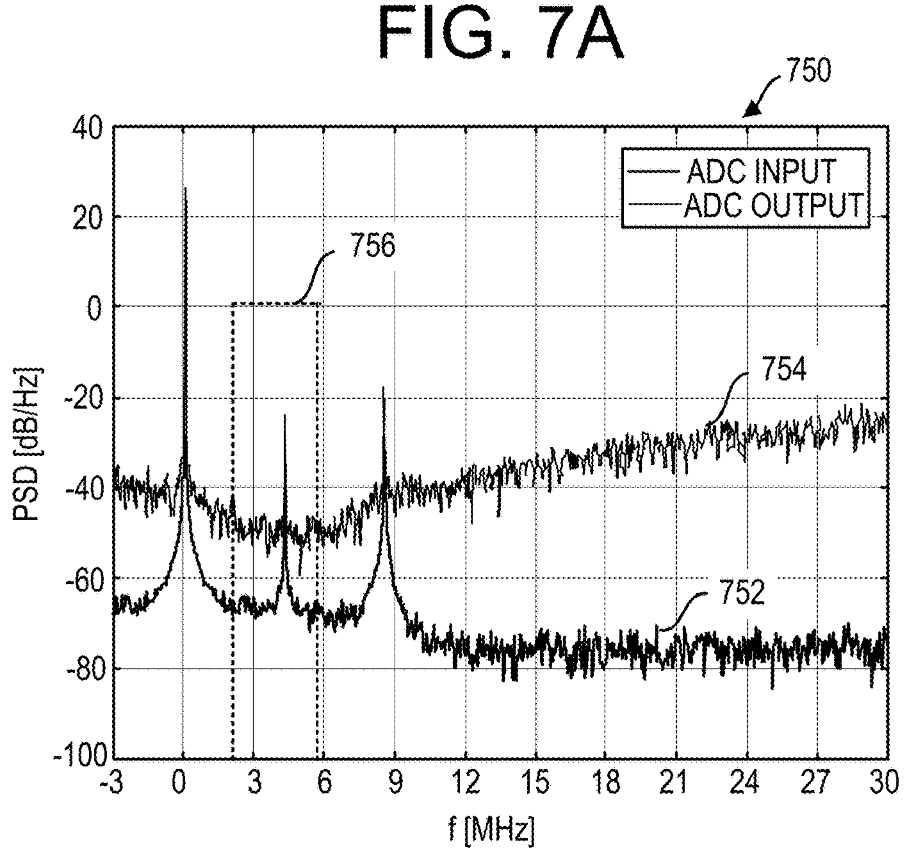
FIG. 7B is an exemplary output spectrum of the quadrature bandpass ADC of FIG. 2 for a LOFT measurement.

FIG. 7B is an exemplary output spectrum 750 of the quadrature bandpass ADC 152 of FIG. 1 and FIG. 2 for the LOFT measurement. The ADC input is indicated at 752, while the ADC output is indicated at 754. In this example, the notch frequency is set to 4.2 MHz. Accordingly, in the relevant frequency range as indicated at 756 for measuring LOFT, noise is suppressed. In some examples, a dynamic range improvement of about 12 dB may be obtained by using a quadrature bandpass ADC compared to using an ADC that operates as a lowpass ADC. The dynamic range improvement of about 12 dB may be sufficient to reach the spectral mask requirement (e.g., as illustrated in FIGS. 3A and 3B).

Figure 8:
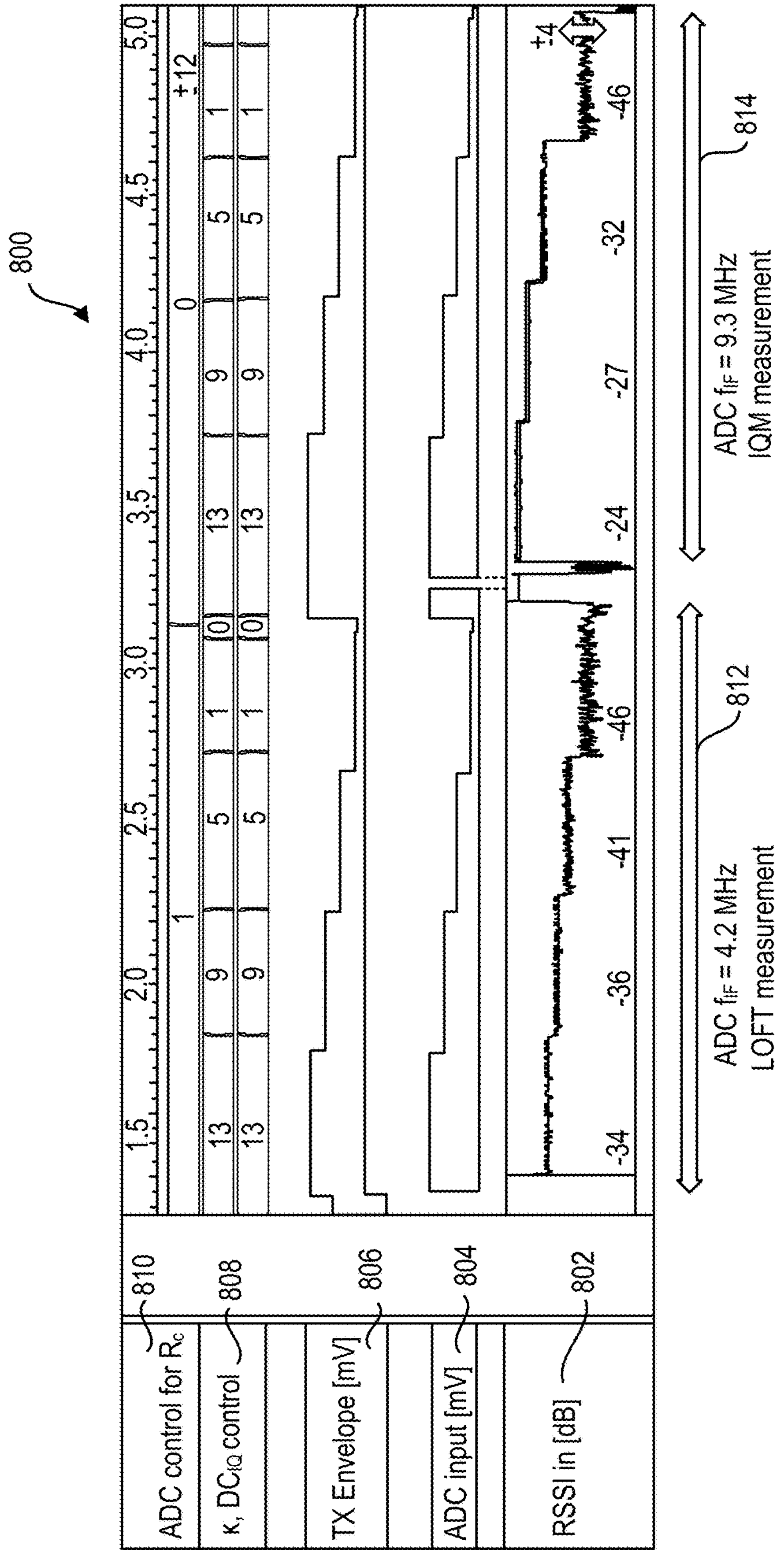
FIG. 8 is an exemplary output of a simulation of a LOFT measurement and an IQM measurement for the transmitter of FIG. 1

FIG. 8 is an exemplary output 800 of a simulation of a LOFT measurement and an IQM measurement for the transmitter 100 of FIG. 1. The simulation includes the output of RSSI detector 172 as indicated at 802, the input to the quadrature bandpass ADC 152 as indicated at 804, the transmit signal envelope as indicated at 806, the IQ compensator 114 feedback parameters as indicated at 808, and an ADC control signal to set programmable cross resistors 290, 292, 294, and 296 of FIG. 2. As illustrated in FIG. 8, by using the quadrature bandpass ADC and by selecting the notch frequency (e.g., $f_1$=4.2 MHz) for LOFT measurements as indicated at 812 and by selecting the notch frequency (e.g., $f_1$=9.375 MHz) for IQM measurements as indicated at 814, noise can be suppressed around the relevant frequency ranges.

Figure 9A:
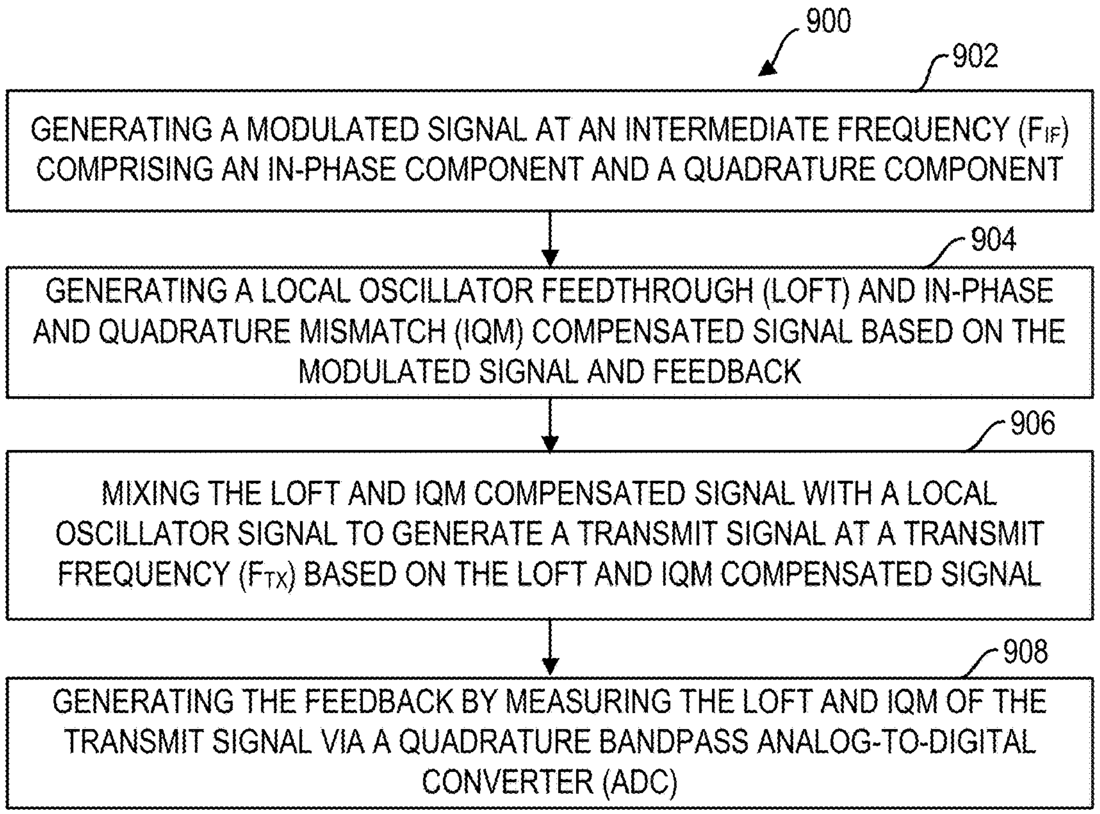
FIGS. 9A-9D are flow diagrams illustrating an exemplary method for transmitting a signal.

FIGS. 9A-9D are flow diagrams illustrating an exemplary method 900 for transmitting a signal. In some examples, method 900 may be implemented by transmitter 100 of FIG. 1. As illustrated in FIG. 9A at 902, method 900 includes generating (e.g., via modulator 110 of FIG. 1) a modulated signal at an intermediate frequency ($f_{IF}$) comprising an in-phase (I) component and a quadrature (Q) component. At 904, method 900 includes generating (e.g., via IQ compensator 114 of FIG. 1) a local oscillator feedthrough (LOFT) and in-phase and quadrature mismatch (IQM) compensated signal based on the modulated signal and feedback (e.g., feedback from minimum search logic 176). At 906, method 900 includes mixing (e.g., via mixer 134 of FIG. 1) the LOFT and IQM compensated signal with a local oscillator signal (e.g., from PLL 106) to generate a transmit signal at a transmit frequency ($f_{TX}$) based on the LOFT and IQM compensated signal. At 908, method 900 includes generating (e.g., via the feedback path of transmitter 100 of FIG. 1) the feedback by measuring the LOFT and IQM of the transmit signal via a quadrature bandpass analog-to-digital converter (ADC) (e.g., quadrature bandpass ADC 152 of FIG. 1 and FIG. 2).

Figure 9B:
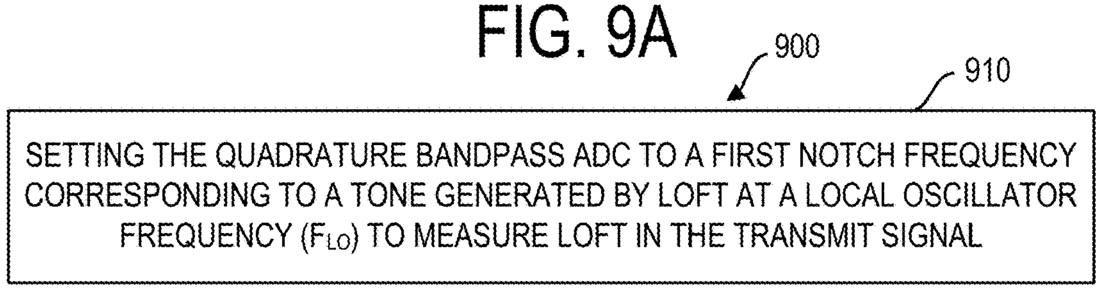
Figure 9C:
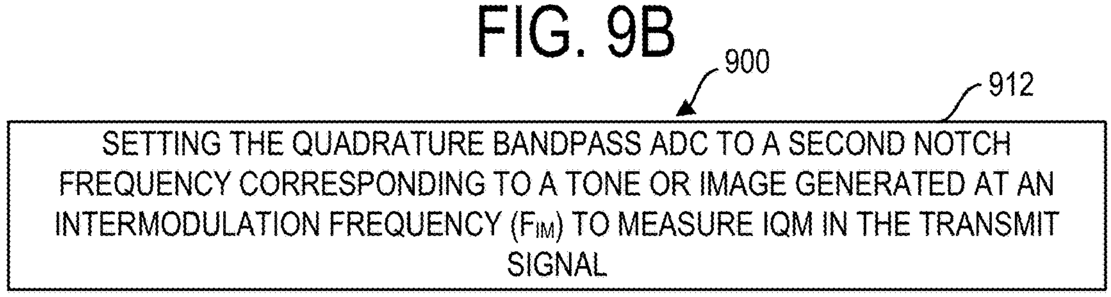
Figure 9D:
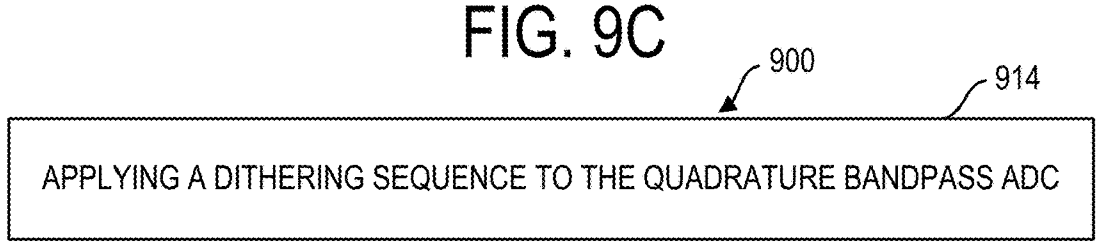

As illustrated in FIG. 9B at 910, method 900 may further include setting (e.g., via programable cross resistors 290, 292, 294, and 296 of FIG. 2) the quadrature bandpass ADC to a first notch frequency (e.g., 4.2 MHz) corresponding to a tone generated by LOFT at a local oscillator frequency ($f_{LO}$) to measure LOFT in the transmit signal. As illustrated in FIG. 9C at 912, method 900 may further include setting (e.g., via programable cross resistors 290, 292, 294, and 296 of FIG. 2) the quadrature bandpass ADC to a second notch frequency (e.g., 8.4 MHz or 9.375 MHz) corresponding to a tone or image generated at an intermodulation frequency ($f_{IM}$) to measure IQM in the transmit signal. As illustrated in FIG. 9D at 914, method 900 may further include applying a dithering sequence (e.g., via dither generator 236 of FIG. 2) to the quadrature bandpass ADC.

It is to be understood that the features of the various exemplary embodiments described herein may be combined with each other, unless specifically noted otherwise.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A transmitter comprising:
 a modulator to generate a modulated signal at an intermediate frequency ($f_{IF}$) comprising an in-phase component and a quadrature component;
 a compensator to generate a local oscillator feedthrough (LOFT) and in-phase and quadrature mismatch (IQM) compensated signal at $f_{IF}$ based on the modulated signal and feedback;
 an up-converter to generate a transmit signal at a transmit frequency ($f_{TX}$) based on the LOFT and IQM compensated signal; and
 a feedback path to generate the feedback based on the transmit signal,
 wherein the feedback path comprises a quadrature bandpass analog-to-digital converter (ADC) to measure LOFT and IQM in the transmit signal.

2. The transmitter of claim 1, wherein the quadrature bandpass ADC comprises a first portion to process an in-phase component of the transmit signal and a second portion to process a quadrature component of the transmit signal.

3. The transmitter of claim 1, wherein the quadrature bandpass ADC is set to a first notch frequency corresponding to a baseband frequency component produced by LOFT at a local oscillator frequency ($f_{LO}$) to measure LOFT in the transmit signal.

4. The transmitter of claim 3, wherein the first notch frequency equals the intermediate frequency ($f_{IF}$).

5. The transmitter of claim 1, wherein the quadrature bandpass ADC is set to a second notch frequency corresponding to a baseband frequency component produced by a tone or image at an intermodulation frequency ($f_{IM}$) to measure IQM in the transmit signal.

6. The transmitter of claim 5, wherein the second notch frequency equals two times the intermediate frequency ($2\times f_{IF}$).

7. The transmitter of claim 1, wherein the quadrature bandpass ADC comprises programmable cross resistors to set a notch frequency of the quadrature bandpass ADC.

8. The transmitter of claim 1, wherein the quadrature bandpass ADC comprises a first order quadrature bandpass continuous-time (CT) sigma-delta ADC.

9. A transmitter comprising:
 a modulator to generate a modulated signal at an intermediate frequency ($f_{IF}$) comprising an in-phase component and a quadrature component;
 a compensator to generate a local oscillator feedthrough (LOFT) and in-phase and quadrature mismatch (IQM) compensated signal at $f_{IF}$ based on the modulated signal and feedback;

an up-converter to generate a transmit signal at a transmit frequency ($f_{TX}$) based on the LOFT and IQM compensated signal; and a feedback path to generate the feedback based on the transmit signal, wherein the feedback path comprises:

a quadrature bandpass analog-to-digital converter (ADC) to measure LOFT and IQM in the transmit signal; and a digital receiver chain between the quadrature bandpass ADC and the compensator to generate the feedback based on an output from the quadrature bandpass ADC.

10. The transmitter of claim 9, wherein the feedback path further comprises:

a transmit signal strength indicator (TSSI) detector to measure a signal strength of the transmit signal; and a buffer to generate a scaled signal to an input of the quadrature bandpass ADC based on an output signal of the TSSI detector.

11. The transmitter of claim 9, wherein the digital receiver chain comprises:

a receiver coordinate rotation digital computer (RX-Cordic) to shift the LOFT measurement and IQM measurement to a reference point;

a channel selection filter to filter the shifted LOFT measurement and the shifted IQM measurement to generate a filtered LOFT measurement and a filtered IQM measurement;

a received signal strength indicator (RSSI) detector to measure a signal strength of the filtered LOFT measurement and the filtered IQM measurement; and minimum search logic to generate the feedback based on the signal strength of the filtered LOFT measurement and the signal strength of the filtered IQM measurement.

12. The transmitter of claim 9, wherein the transmitter comprises a Bluetooth channel sounding (BT-CS) transmitter.

13. The transmitter of claim 12, wherein the transmitter comprises a BT-CS phase-based ranging (BT-CS-PBR) transmitter.

14. The transmitter of claim 9, further comprising:

a power amplifier to amplify the transmit signal to a maximum output power level.

15. The transmitter of claim 14, wherein the transmitter comprises an image rejection.

16. The transmitter of claim 9, wherein the feedback comprise a modulation index (κ) parameter, a phase (θ) parameter, and a direct current component in the IQ signal ($DC_{IQ}$) parameter.

17. A method for transmitting a signal, the method comprising:

generating a modulated signal at an intermediate frequency ($f_{IF}$) comprising an in-phase component and a quadrature component;

generating a local oscillator feedthrough (LOFT) and in-phase and quadrature mismatch (IQM) compensated signal based on the modulated signal and feedback;

mixing the LOFT and IQM compensated signal with a local oscillator signal to generate a transmit signal at a transmit frequency ($f_{TX}$) based on the LOFT and IQM compensated signal; and generating the feedback by measuring the LOFT and IQM of the transmit signal via a quadrature bandpass analog-to-digital converter (ADC).

18. The method of claim 17, further comprising:

setting the quadrature bandpass ADC to a first notch frequency corresponding to a tone generated by LOFT at a local oscillator frequency ($f_{LO}$) to measure LOFT in the transmit signal.

19. The method of claim 17, further comprising:

setting the quadrature bandpass ADC to a second notch frequency corresponding to a tone or image generated at an intermodulation frequency ($f_{IM}$) to measure IQM in the transmit signal.

20. The method of claim 17, further comprising:

applying a dithering sequence to the quadrature bandpass ADC.

* * * * *